Feb. 28, 1950     P. V. McCASH     2,499,323
ELECTRIC EDUCATIONAL DEVICE
Filed March 17, 1947     3 Sheets—Sheet 1
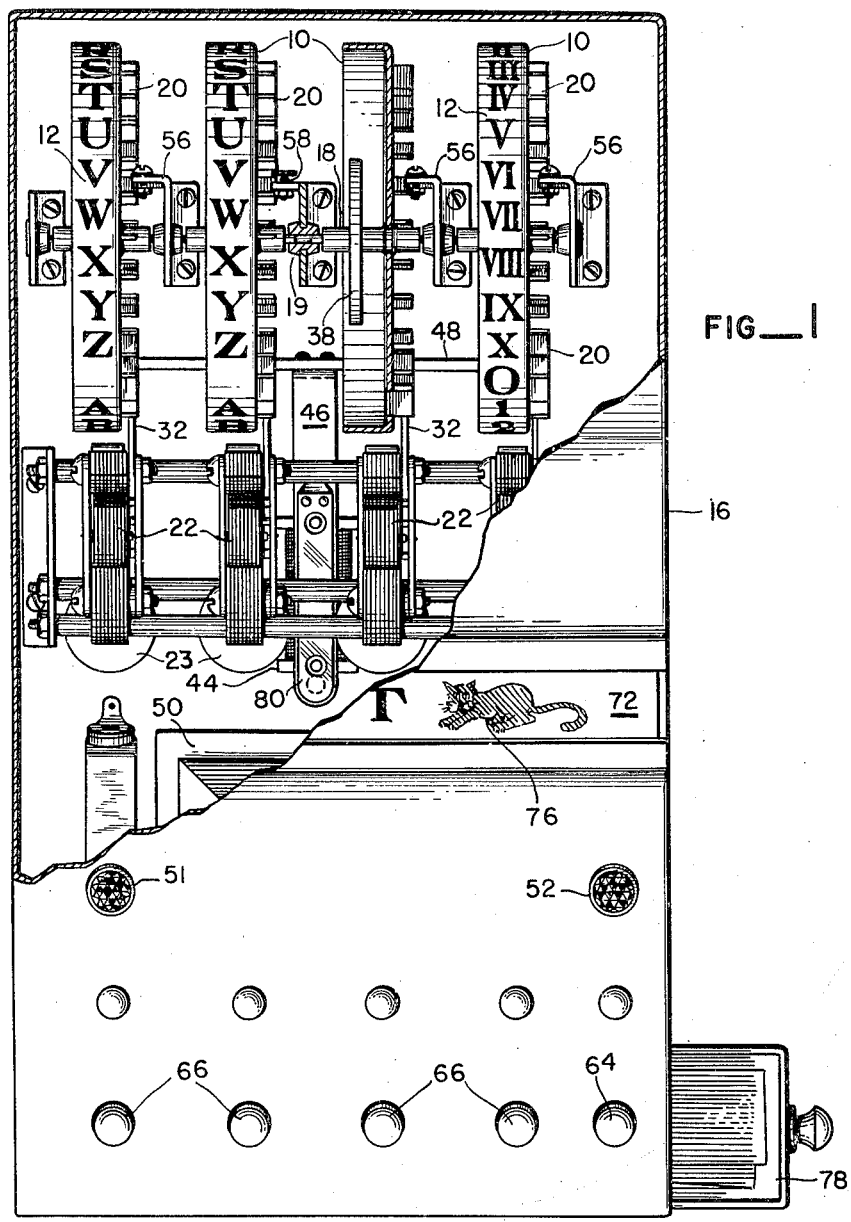
FIG__1
PERRY V. McCASH
*INVENTOR.*
BY *Smith & Tuck*
ATTORNEYS Feb. 28, 1950    P. V. McCASH    2,499,323
ELECTRIC EDUCATIONAL DEVICE
Filed March 17, 1947    3 Sheets—Sheet 2
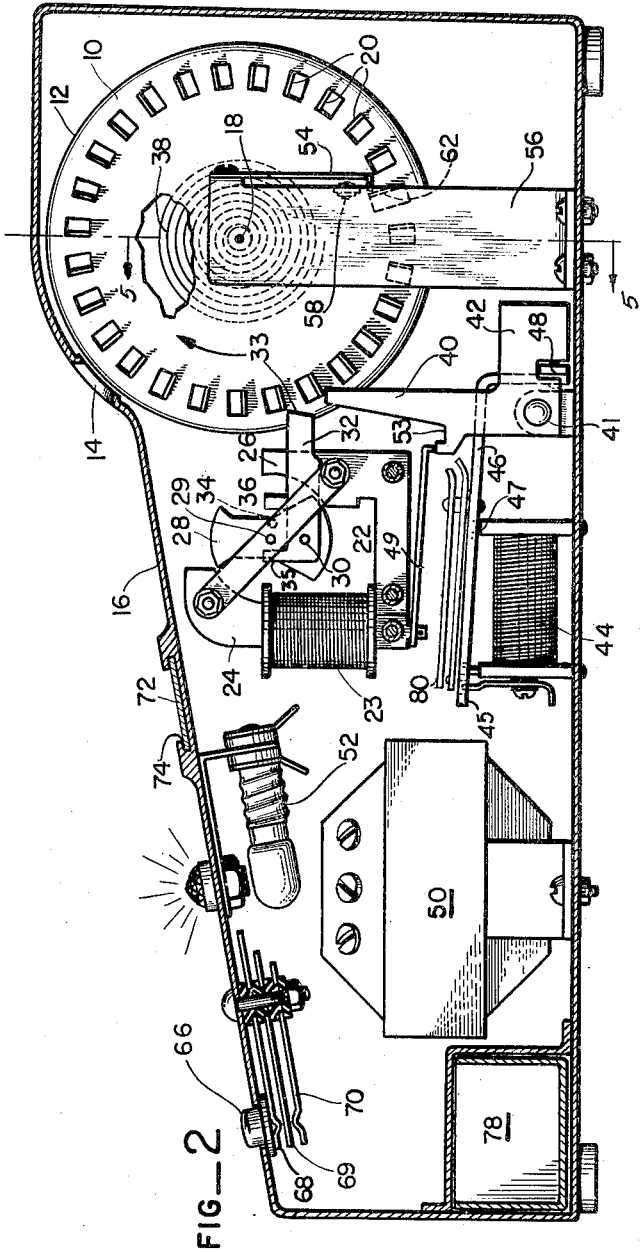
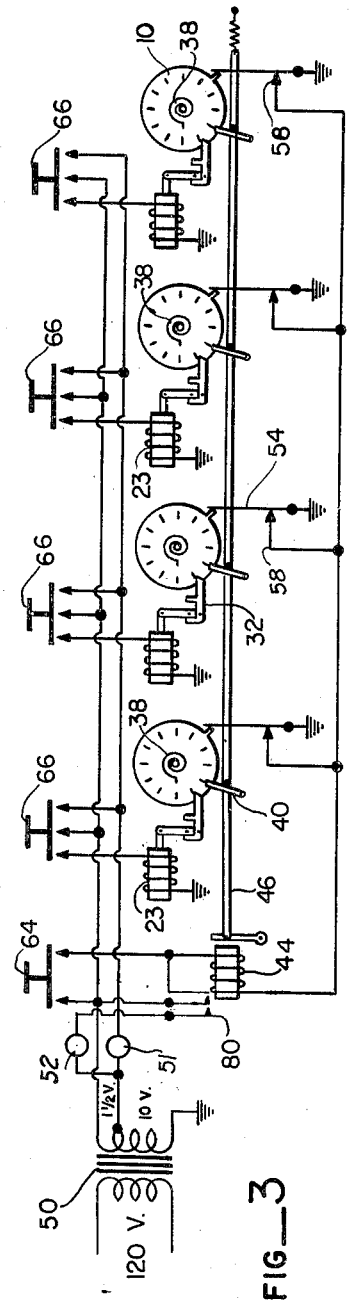
PERRY V. McCASH
    INVENTOR.
BY *Smith & Tuck*
    ATTORNEYS Feb. 28, 1950 P. V. McCASH 2,499,323
ELECTRIC EDUCATIONAL DEVICE
Filed March 17, 1947 3 Sheets-Sheet 3
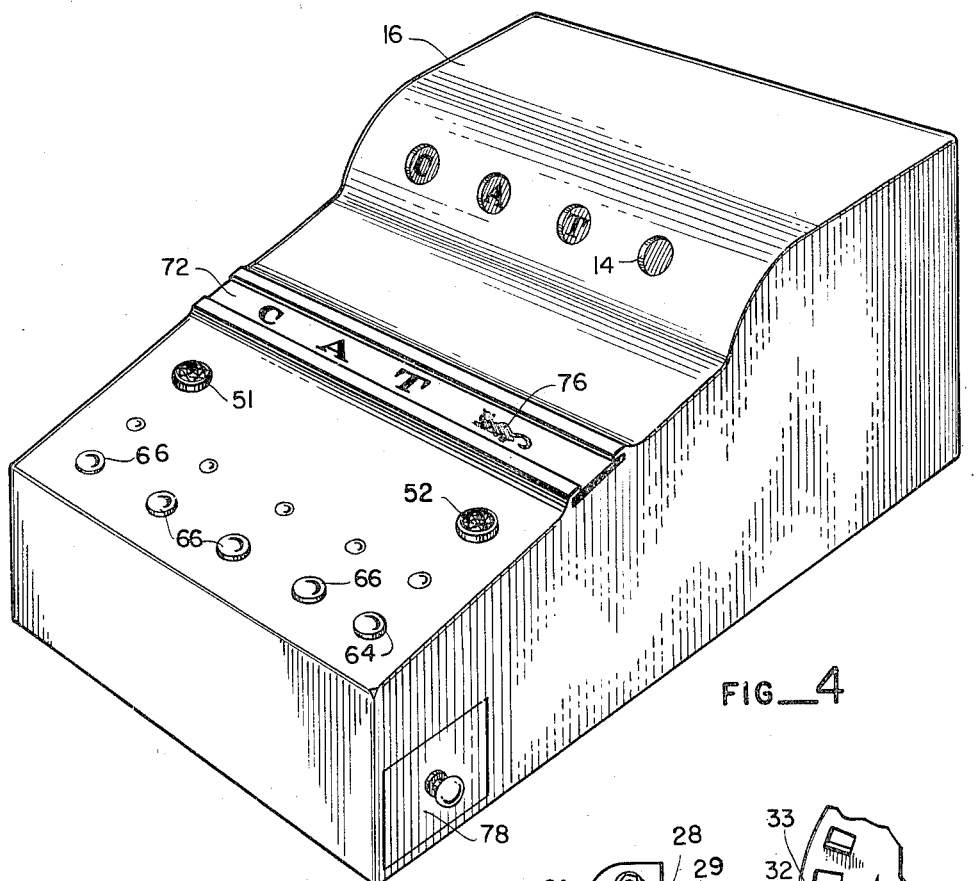
FIG_4
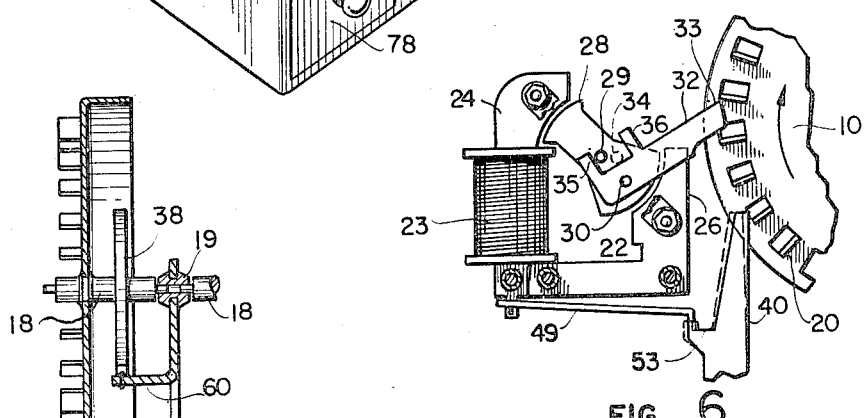
FIG_5
FIG_6
PERRY V. McCASH
*INVENTOR.*
BY Smitt & Tuck
ATTORNEYS Patented Feb. 28, 1950

2,499,323

UNITED STATES PATENT OFFICE 2,499,323

ELECTRIC EDUCATIONAL DEVICE

Perry V. McCash, Seattle, Wash.

Application March 17, 1947, Serial No. 735,238

2 Claims. (Cl. 35—35)

My present invention relates to that general class of devices used as aids in teaching the use of the alphabet and, more particularly, to spelling. Specifically, my device is an electric educational device.

It has long been recognized that if children can be given preliminary instruction during their pre-school years, their education after their entry into grade schools, has a much more satisfactory basis and permits the more rapid advancement of the child.

My invention has been designed to provide a piece of mechanical equipment which, through its electrical operation, will be intriguing and thus tend to excite the curiosity and hold the attention of younger children. I have then arranged for the forming of words and I have also arranged the alphabet in its normal sequence on each of the various alphabet wheels or drums I employ, so that education may be carried to the practical limit of such pre-school training.

In the past, many devices have been created which have for the general object the same fundamental purpose. However, experience has proven that too many of these devices are treated just as toys which are played with for a limited period and then discarded. It is to overcome this condition that I have provided a machine which is quite in step with modern times, and I have employed electrical means for the operation of the various elements of my device. This arrangement presents an old subject, but presents it in an interesting manner which makes it possible to sustain interest in the device and through its operation to provide a truly educational device.

The principal object of my present invention, therefore, is to provide an electrically operated spelling aid.

A further object of my present invention is to provide an electrically operated spelling aid which, because of the functioning in response to pressing the proper contact buttons, maintains the interest of a small child in its operation.

A further object of my present invention is to provide means whereby words or phrases can be spelled out and then, when the entire group of letters or words have been formed, the pressing of a clearance button clears the whole machine for subsequent operation.

A further object of my invention is to provide an electro-mechanical teaching aid which is characterized by simple construction lending itself well to economical manufacture to the end that the element of price to the user can be kept within the bounds of the ordinary purchaser.

A further object of my present invention is to provide an electro-mechanical device which is so arranged that it will excite the curiosity of a child and indirectly provide the educational advantages that such a mechanical device is capable of, if its use can be practically continued.

Further objects, advantages, and capabilities will be apparent from the description and disclosure in the drawings, or may be comprehended or are inherent in the device.

In the drawings:

Fig. 1 is a top plan view of my electric educational aid, with a portion of the cover removed and with certain parts shown in section to better illustrate the construction of the device.

Fig. 2 is a side elevational view of my device, in section, showing the essential functional elements for one unit of my device.

Fig. 3 is a schematic wiring diagram of my device.

Fig. 4 is a perspective view showing the outward appearance of my device with a word set up on the machine.

Fig. 5 is a cross-sectional view taken substantially along the line 5—5 of Fig. 2.

Fig. 6 is a fragmentary view showing certain parts as illustrated in Fig. 2 but showing them in a different phase of their operation.

Referring more particularly to the disclosure in the drawings, the numeral 10 designates an alphabet wheel or drum. This wheel is provided with a drum face 12, upon which is disclosed the complete alphabet spaced around the drum in its normal order; or the drum may have numerals, either Roman or Arabic, again in their normal numerical order. The letters or numerals are preferably as large as a convenient size drum will permit of and are disposed so that they may be properly viewed through openings or windows 14 cut in the upper portion of housing 16.

In my present drawings, I have shown four such drums or wheels, although it should be apparent that any desired number of these can be employed. Four drums will usually provide sufficient latitude for pre-school children and it is a convenient commercial size for my device.

The various wheels 10 are preferably all of the same diameter and co-axially aligned for structural reasons. Each wheel is provided with its own supporting shaft 18, which is journalled in removable journal members 19, normally arranged to support one end of two shafts 18 after the showing probably best illustrated in Fig. 1.

Each wheel 10 has formed near its periphery, or on it, a plurality of teeth or outstanding lugs 20, there being one such lug for each letter or digit on the drum. This arrangement is to facilitate the step-by-step revolution of the wheel by the mechanism as will be latter explained.

In order to revolve wheel 10 in a step-by-step arrangement, I have provided the motor shown generally at 22. This consists of the motor winding 23 and the pole pieces 24 and 26. Disposed between pole pieces 24 and 26 is rotor 28. Rotor 28 is mounted for partial rotation upon rotor shaft 29. Pivotably secured at 30 to rotor 28 is latch member 32. Latch 32 has the outer engaging portion 33 which has sufficient vertical extent so it will fit loosely between adjacent teeth or lugs 20, the purpose being to provide, as will probably best be seen in Figs. 2 and 6, a means for engaging one of the lugs 20 and then, when moved by the rotor as viewed in Fig. 6, to revolve wheel 10 one space, and to provide by the width of the engaging portion 33 a stop, so that only one tooth will be moved for each energizing of motor 22. The movement of latch 32 about pivot 30 is limited by means of the stop pin 34 and the two co-acting upstanding lugs 35 and 36 which are formed as part of latch 32.

Wheel 10, while free to revolve on its shaft 18, is under control of the coil spring 38 which is wound up as the wheel is advanced in use by the functioning of motor 22 in the direction indicated by the arrow in Fig. 2, and when the proper setting for the drum or wheel has been achieved, the wheel may be released and spring 38 will return the wheel to its normal position which is a blank space on the wheel preceding the letter "A" or the numeral "1." To hold wheel 10 in any desired position when motor 22 is not energized, I have provided a stop member 40. This stop is pivoted at 41 and is provided with a counterbalancing weight 42 so arranged that the stop member normally will assume the position shown in Fig. 2 and become a stop bearing upon lugs 20 and preventing a reversal in the direction of rotation of drum 10.

When the problem or word has been completed and it is desired to clear the machine, energizing of electro-magnet 44 rocks lever 46 about its fulcrum 47, lifting the end portion 48, which engages the weighted end of stop 40, and thus moves stop 40 to the left, as viewed in Fig. 2, and withdraws the upper portion of the stop from engagement with lugs or teeth 20. This will permit spring 38 to take control of drum 10 and return it to normal.

To insure the complete removal of stop 40 from the path of lugs 20, I provide a magnetic armature 49. This strip armature is pivoted to the frame of motor 22 and will be attracted and displaced upwardly each time motor 22 is energized. A very pronounced clicking sound is produced when the armature abuts the pole piece of motor 22 and this has been found to add to the user's interest in the device. The free end of the armature has a downwardly directed hook which is adapted to engage notch 53 of stop 40 each time magnet 44 is energized and swings stop 40 sufficiently to the left, as viewed in Fig. 2 and Fig. 6, to make it possible.

Power at reduced voltages is supplied to my device by means of transformer 50. The circuit of this transformer is shown in Fig. 3 and I thus provide optimum voltages for operating the different parts of my device.

I provide two colored lights as 51 and 52, light 51 being energized each time motor 22 is energized. Light 52 is an indication that release button 64 has been depressed and it continues to burn until all the wheels 10 have returned to normal and have operated their respective circuit breakers 54.

Circuit breaker 54 is mounted upon pedestal 56 which supports bearings or journals 19. Circuit breaker 54 is normally in contact and provides one of the conductors for the current which flows out through electric contact 58. The wheel 10 is under urgence of spring 38, which in turn is anchored at one end to lug 60, and at its other end is secured to shaft 18.

As soon as wheel 10 has been revolved to its normal position of rest, an extended lug 62 will strike the end of circuit breaker 54 and carry it away from contact 58, while the wheel will remain in this position due to spring 38, and the circuit will be broken at this point. The extended lug 62 also serves a second purpose in that upon complete rotation of the wheel 10, said lug 62 again strikes the end of circuit breaker 54 on the opposite side and is thereby prevented from turning further, thus protecting the springs 38 from damage.

It will be noted that in Fig. 3 I have provided a plurality of push button switches, as the release button 64 and the wheel operating button 66. These switches are preferably of the multiple-leaf type, as illustrated in Fig. 2, wherein pressure on the button will complete a circuit through the three leaves as 68, 69 and 70.

In order to provide a convenient reference to aid the child in forming words, I have provided a plurality of removable slides 72 which are engageable within the rabbeted out slideway 74, and on which I imprint normally a name and a picture corresponding to the same. It will be noted in Fig. 4, for instance, that the letters C, A, T, are followed by a picture of a cat as at 76. As it is desirable to have a plurality of such slides, I have provided the slide retaining box 78 for the convenient storing of these slides.

Method of operation

In operating my device, the first step is to start with the transformer 50 connected to a source of electric current. Then, on the assumption that the word "cat" is to be spelled out, slide 72 is placed in slideway 74, after the showing of Fig. 4. Here the word "cat" is spelled out with each letter in substantial alignment with the housing opening 14 in which the respective letters should appear. Then, in the first instance, button 66, in alignment with the letter "C" is pressed. This will cause the letter "A" to appear in the left-hand opening 14. Then, as the button is pressed the second time, the letter "B" will appear and finally on the third pressing of its corresponding button 66 the letter "C" will appear and, as that is in alignment with the "C" on strip 72, the operator should then go to the second button 66 as viewed from the left. Here, a single depression of the button will cause drum 10 to revolve one step to bring the letter "A" into view. This completes the first two letters of the word and the operator then moves to the third or center button as viewed. Here, the button must be depressed until the letter "T" appears. This will require 20 depressions of the appropriate switch contact 66 passing over all of the letters from A to T, which letters will appear in their normal sequence in the alphabet. This completes the spelling of the words "cat" and it has been found that such experiences quickly enable a child to thoroughly understand the alphabet and to gradually acquire by repetition the correct spelling of the more common words.

By reference to Fig. 2 the mechanical and electrical operations required for the preceding sequence has been the operation of three different motors 22 the number of times equivalent to the position of the various letters as they appear in the alphabet, of the letters spelling the word "cat." In the last letter "T" it will require 20 movements or separate energizings of motor 22. Each time rotor 28 will make a partial revolution to the position shown in Fig. 6, and will move drum 10 the space of each lug 20 for each time it is so energized. During each of these operations stop 40 must be re-engaged under the appropriate lug 20 so as to hold drum 10 against the backward turning effort of the spring 38.

If the operator then desires to clear the machine he depresses button 64 which is on the extreme right in Fig. 4 and, in so doing, he energizes coil 44. When coil 44 attracts its armature 45, the electro-switch 80 closes a circuit which lights lamp 52, and a seal-in circuit across the contacts of button 64 thus making it necessary to depress button 64 only momentarily. In addition, this movement of armature 45, through means of lever 46, withdraws stop 40 from its contacting position with respect to lug 20, causes armature 49 to engage notch 53, and permits spring 38 to spin drum 10 backward with respect to the arrow shown in Fig. 2 until the elongated lug 62 finally comes into contact with the circuit breaker 54. When this occurs, the current flow is interrupted through contact 58 and electro-switch 80, which was closed when button 64 was first depressed and which made it only necessary to press and release button 64, which is now free of attraction by coil 44 and due to its inherent spring action opens, and the machine is now fully cleared for future problems or words.

It is believed that it will be clearly apparent from the above description and the disclosure in the drawings, that the invention comprehends a novel construction of an electrical educational device.

Having thus described my invention, I claim:

1. An electric educational device, consisting of: a plurality of axially aligned drums having equi-spaced letters of the alphabet imprinted on their peripheral surfaces; individual supporting shafts for said drums; standards adapted to position and support said shafts; a series of outstanding lugs disposed about the periphery of said drums; a pivoted latch member for each of said drums adapted to revolve said drums in a step-by-step manner; electric motor means adapted to operate said latch members and to form a first electromagnet when energized; a counterrotation spring for each drum disposed to resist the turning effort of said latch; a pivoted stop member for each drum disposed to normally prevent counterrotation of said drum; an armature pivoted to said first electromagnet having a downwardly directed hook adapted to secure said stop member when it has moved into its non-operative position; a second electro-magnet adapted to move said stop into a non-operative position; a first electric signaling means adapted to indicate actuation of said electric motor means; a second electric signaling means adapted to indicate the actuation of said second electro-magnet; first electric switching means adapted to energize said electric motor means, said first electro-magnet, and said first electric signaling means; second electric switching means adapted to energize said second electro-magnet and said second electric signaling means; a holding circuit adapted to short circuit said second electric switching means; a circuit breaker for each drum, supported by said standards, adapted to be engaged by a lug on said drum to prevent more than one revolution of said drum, and additionally adapted to de-energize said second electro-magnet when the drum has been returned to its starting position; electric current supply means for said device; an enclosing housing for said equipment; a flanged slideway on the upper face of said housing; and a slide having imprinted thereon letters forming words.

2. An electric educational device, consisting of: a plurality of axially aligned drums having equi-spaced letters of the alphabet imprinted on their peripheral surfaces; individual supporting shafts for said drums; standards adapted to position and support said shafts; a series of outstanding lugs disposed about the periphery of said drums; a pivoted latch member for each of said drums adapted to revolve said drums in a step-by-step manner; electric motor means adapted to operate said latch members and to form a first electro-magnet when energized; a counterrotation spring for each drum disposed to resist the turning effort of said latch; a pivoted stop member for each drum disposed to normally prevent counterrotation of said drum; an armature pivoted to said first electro-magnet having a downwardly directed hook adapted to secure said stop member when it has moved into its non-operative position; a second electro-magnet adapted to move said stop into a non-operative position; a first electric signaling means adapted to indicate actuation of said drums; a second electric signaling means adapted to indicate the functioning of said second electro-magnet; first electric switching means adapted to energize said electric motor means, said first electro-magnet, and said first electric signaling means; second electric switching means adapted to energize said second electro-magnet and said second electric signaling means; a seal-in electric circuit adapted to short circuit said second electric switching means; a circuit breaker for each drum, supported by said standards, adapted to be engaged by a lug on said drum to prevent more than one revolution of said drum, and additionally adapted to de-energize said second electro-magnet when the drum has been returned to its starting position; and an enclosing housing for said equipment.

PERRY V. McCASH.

REFERENCES CITED

The following references are of record in the file of this patent:

UNITED STATES PATENTS

| Number | Name | Date |
| --- | --- | --- |
| 366,821 | Dougherty | July 19, 1887 |
| 371,815 | Bodey | Oct. 18, 1887 |
| 465,834 | Clarkson | Dec. 29, 1891 |
| 2,060,674 | Hicks | Nov. 10, 1936 |
| 2,155,929 | Breitenstein | Apr. 25, 1939 |
| 2,281,262 | Breitenstein | Apr. 28, 1942 |